No. 827,200. PATENTED JULY 31, 1906.
G. A. WOODMAN.
BRAKE HEAD.
APPLICATION FILED MAR. 9, 1905.
3 SHEETS—SHEET 1.
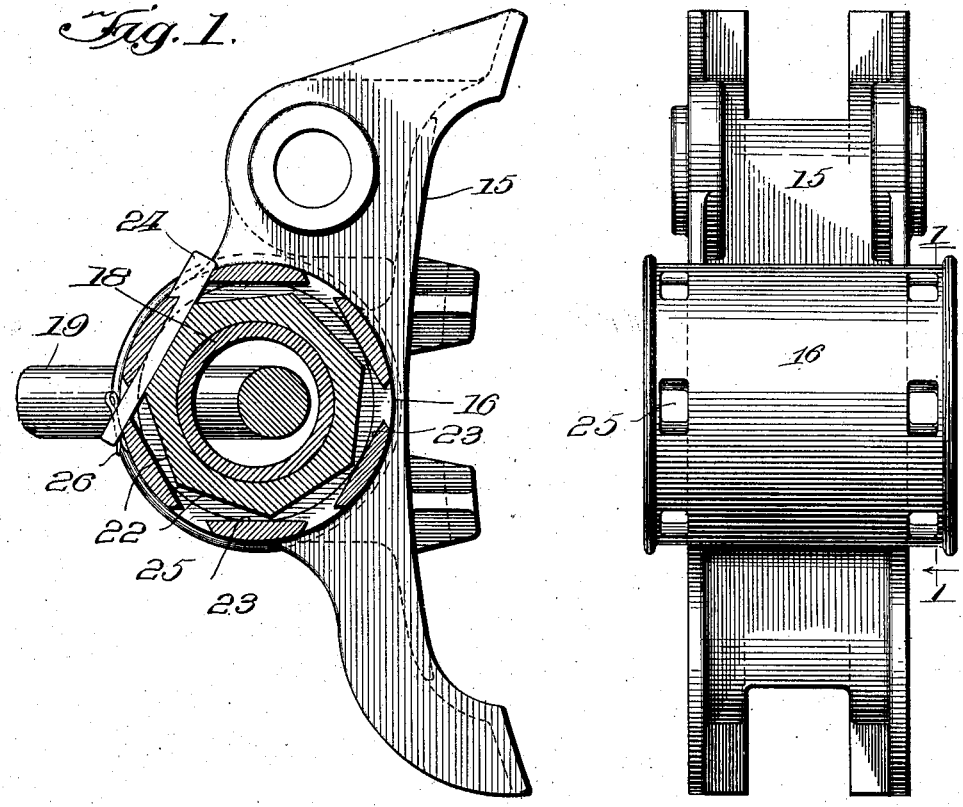
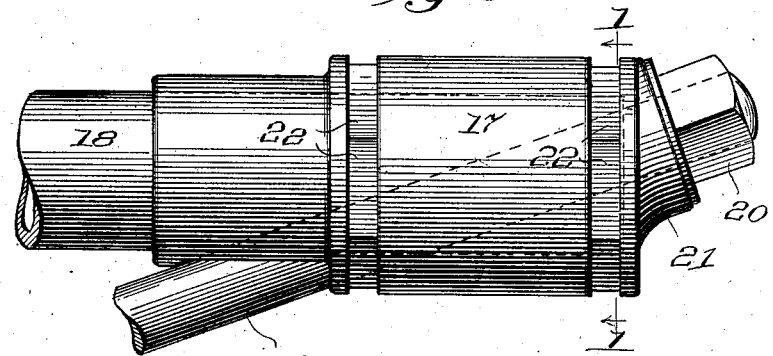

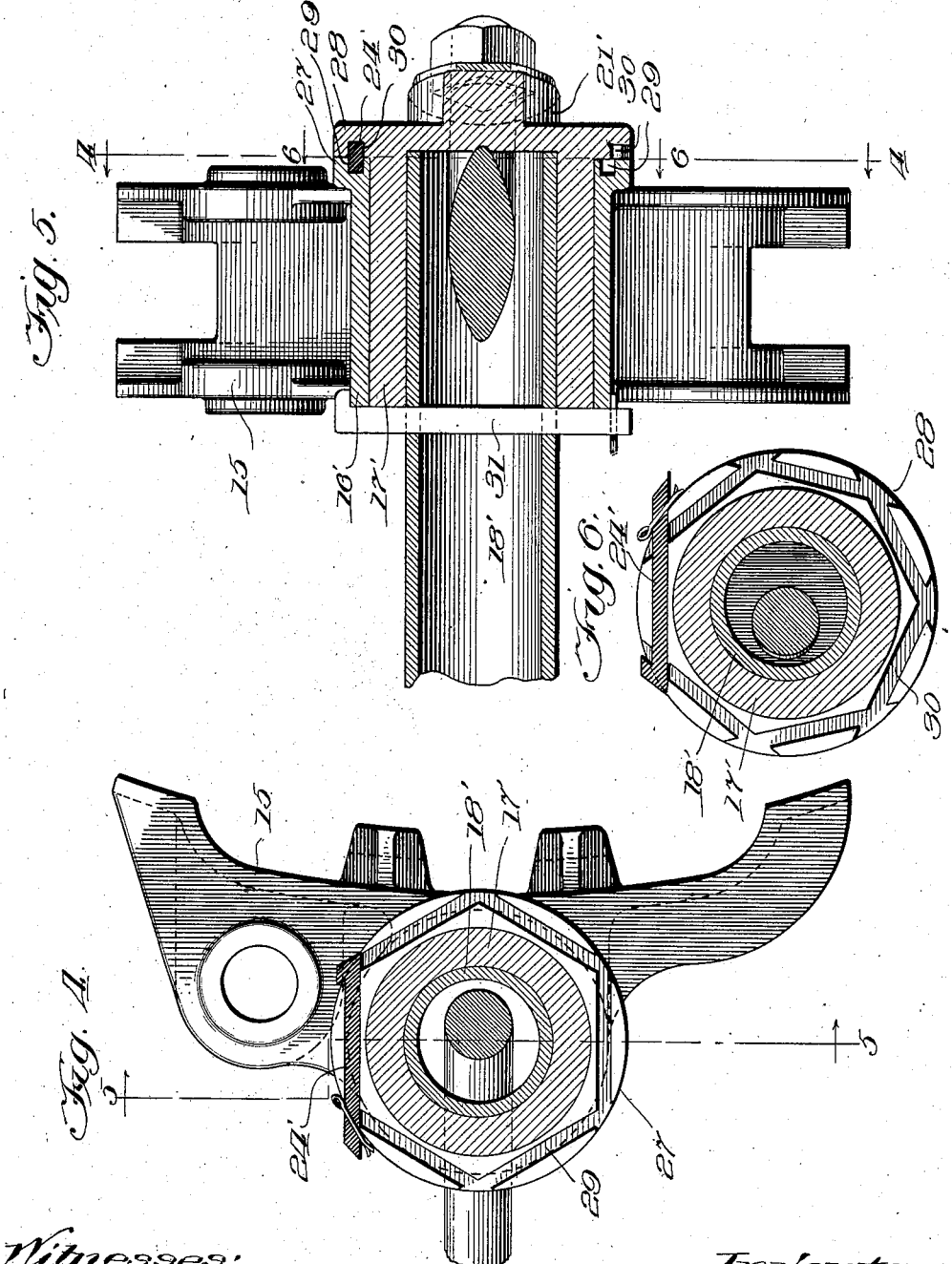

No. 827,200. PATENTED JULY 31, 1906.
G. A. WOODMAN.
BRAKE HEAD.
APPLICATION FILED MAR. 9, 1905.
3 SHEETS—SHEET 3.
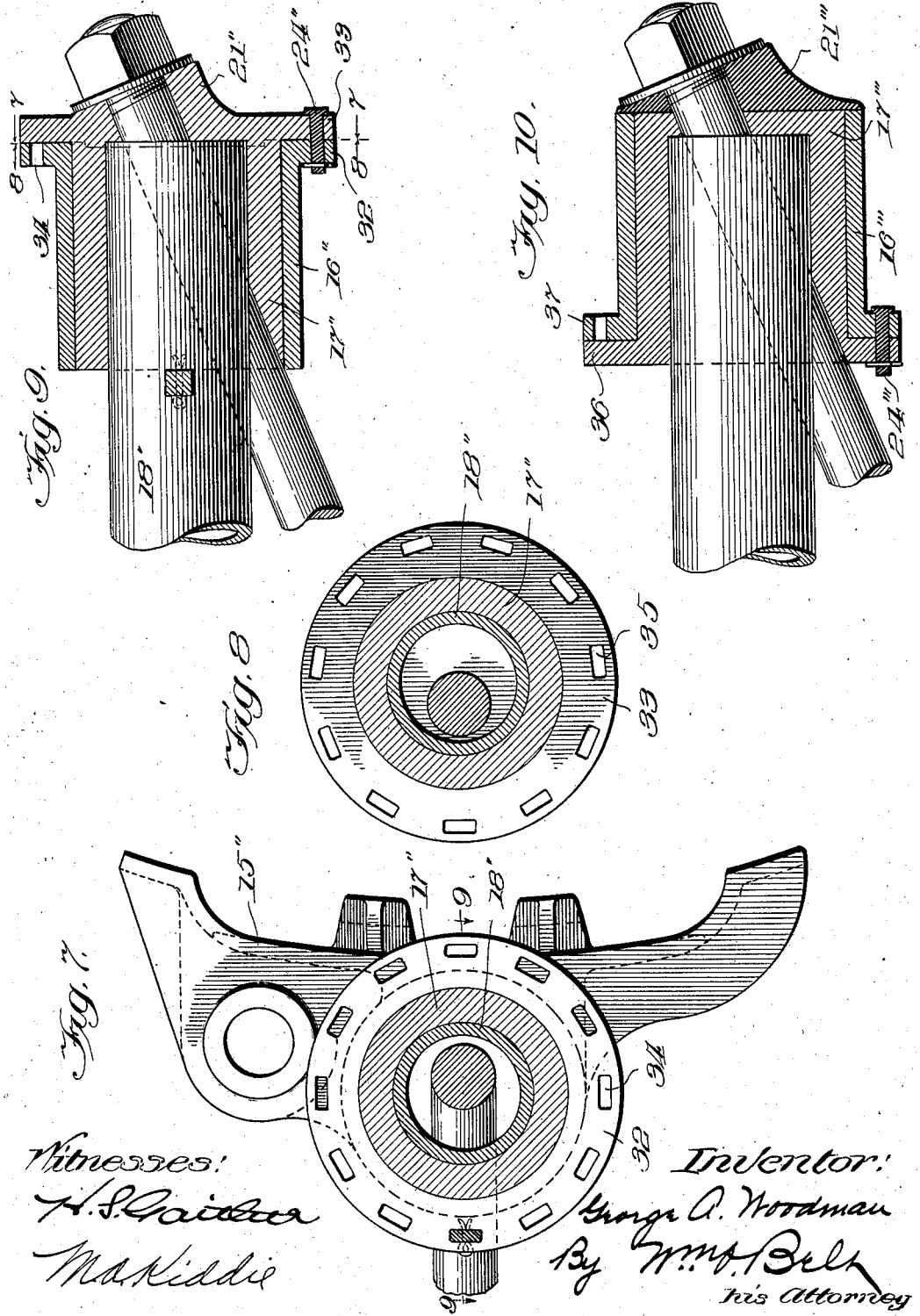

UNITED STATES PATENT OFFICE.

GEORGE ALVERADO WOODMAN, OF CHICAGO, ILLINOIS.

BRAKE-HEAD.

No. 827,200.
Specification of Letters Patent.
Patented July 31, 1906.

Application filed March 9, 1905. Serial No. 249,196.

*To all whom it may concern:*

Be it known that I, GEORGE ALVERADO WOODMAN, a citizen of the United States, residing at Chicago, in the county of Cook and State of Illinois, have invented new and useful Improvements in Brake-Heads, of which the following is a specification.

This invention relates to adjustable brake-heads for railway-car brakes; and its object is to provide a multiplicity of adjustments for the head on the brake-beam, so that the brake-shoe may be adjusted and held in any desired position relative to the wheel.

Further objects of the invention are to enable the brake-head to be quickly adjusted as required and to lock the head firmly and rigidly on the beam in its adjusted position.

In the accompanying drawings I have illustrated several different ways in which the invention can be embodied with a tubular beam.

Referring to the drawings, Figure 1 is a sectional view on the lines 1 1 of Figs. 2 and 3. Fig. 2 is an elevation of the brake-head. Fig. 3 shows one end of a tubular brake-beam. Fig. 4 is a sectional view on the line 4 4 of Fig. 5. Fig. 5 is a sectional view on the line 5 5 of Fig. 4. Fig. 6 is a sectional view on the line 6 6 of Fig. 5. Fig. 7 is a sectional view on the line 7 7 of Fig. 9. Fig. 8 is a sectional view on the line 8 8 of Fig. 9. Fig. 9 is a sectional view on the line 9 9 of Fig. 7. Fig. 10 is a sectional view similar to Fig. 9, but showing the flanges at the inner end of the head and sleeve.

In the construction illustrated in Figs. 1 to 3, the brake-head 15 is provided with an integral sleeve 16, which fits upon the sleeve 17 on the brake-beam 18. The sleeve 17 may be secured in various ways on the brake-beam, but in the example illustrated it is held securely in place by the truss-rod 19, which passes diagonally through the sleeve and the end of the beam and is secured to the beam by the nut 20 on its outer end and which bears against a cap 21 integral with the sleeve 17 or made separate therefrom and bearing against its end. The sleeve 17 thus forms a permanent and rigid part of the beam 18, and in the commercial practice of the art the truss-rod and the sleeve are comprehended in the term "brake-beam" and should be so understood in the consideration of my invention. The sleeve could be made integral with the beam; but it has been customary to make this a separate part to reduce the cost.

In order to obtain a multiplicity of adjustments of the brake-head on the brake-beam, I provide these parts with locking members, one part having an even number and the other an odd number thereof. In Figs. 1 to 3 these locking members are formed by seven flat faces 22, located end to end below the periphery of the sleeve 17, and by six flat faces 23, located end to end within the sleeve 16. The sleeve 16 is provided with openings 25 at the ends of the flat faces 23 to accommodate the key 24. I have shown the locking members at both ends of the sleeves in these figures; but in this construction, as well as in the others herein set forth, they may be located at either or both ends, as desired.

After the head has been adjusted on the sleeve 17 in proper relation to the wheel the key 24 is slipped into place between those faces of the sleeves which are parallel with each other. This bolt is headed at one end and secured by a cotter-pin 26 at its other end, and it fits snugly between the two parallel faces of the sleeves and holds the head on the beam in a secure and rigid manner. By reason of the fact that there is an odd number of locking-faces on one part and an even number on the other part the head is capable of a multiplicity of adjustments on the beam, and these adjustments can be made so fine in degree by providing the proper number of locking-faces that the head can be secured in practically any position relative to the wheel. I have shown the sleeve 17 provided with seven and the sleeve 16 with six locking-faces; but this is not arbitrary, except in the respect that they are odd and even, and a greater or less number may be employed when found desirable to secure a proportionate delicacy of adjustment, it being obvious that the greater the number of locking-faces the finer will be the adjustment. By reference to Fig. 1 it will be readily observed that when the key is removed a very slight movement of the head will bring two other locking-faces in parallel relation and obviously if a greater number of these locking-faces is provided the delicacy of adjustment will be increased manifold.

There are various ways of embodying the invention, and on sheets 2 and 3 I have shown two other constructions. In Figs. 4 to 6, inclusive, the sleeves 16' and 17' are provided with peripheral flanges 27 and 28, respectively, at one end, and these flanges have an odd and an even number of slots in their adjacent faces. I have shown an even number of slots 29 in the flange of the sleeve 16', Fig. 4, and an odd number of slots 30 in the flange of the sleeve 17', Fig. 6, the slots in each flange being extended through the periphery thereof, so that the key 24' can be inserted in the opening formed by any pair of slots in the two sleeves which may lie parallel with each other, as heretofore described in connection with Figs. 1 to 3. In this construction, Figs. 4 to 6, the locking members are provided at one end only of the sleeves, and a bolt 31 may be arranged transversely through the beam 18' to prevent the head 15' from working inwardly on the beam. The cap 21' is also made integral with the sleeve 17'; but it will be apparent that this cap can be made separate from the sleeve.

In the construction of Figs. 7 to 9, inclusive, the sleeves 16" and 17" are provided with peripheral flanges at their outer ends, and one of these flanges has an even number and the other an odd number of transverse openings to receive the key 24". I have shown the flange 32 of sleeve 16" on the head 15" provided with an even number of openings 34 and the flange 33 of the sleeve 17" on the beam 18" provided with an odd number of openings 35. The head can be adjusted on the beam in the manner heretofore described, and the key fastened in whatever openings in the flanges happen to register with each other in such adjustment. A greater number of openings can be provided in the flanges, and a more delicate adjustment of the parts can be thereby obtained. In Fig. 9 I have shown the cap 21" made integral with the sleeve 17" and the flange 33; but obviously this cap can be made separate.

In Fig. 10 the construction is similar to that illustrated in Figs. 7 to 9, except that the flanges 36 and 37 are located at the inner end of the sleeves instead of at the outer end and the cap 21''' is made separate from the beam-sleeve 17'''. In the construction the head-sleeve 16''' and the beam-sleeve 17''' are rigidly locked together by the key 24''' in the same manner described in connection with Figs. 7 to 9. Wherever it is possible, I prefer to make the cap integral with the beam-sleeve or the beam itself in order to reduce the number of parts.

All of the constructions illustrated embody the salient feature of my invention, which comprises an odd and an even number of locking-faces disposed in adjacent relation on the head and beam, thereby providing for a multiplicity of adjustments of the head relative to the wheel. In Figs. 4 to 6 the walls of the slots and in Figs. 7 to 10 the walls of the openings in the flanges constitute the locking members or faces of the parts. Notwithstanding the fact that the adjustment may be made extremely delicate in degree, the head will be firmly and rigidly locked upon the beam and not liable to become loosened to drop off in service.

In the several constructions herein set forth I have provided the head with an even number and the beam with an odd number of locking members; but this may be reversed, if desired.

Without limiting myself to the exact construction and arrangement of parts herein shown and described, what I claim, and desire to secure by Letters Patent, is—

1. The combination of a brake-beam and a brake-head each embodying a sleeve constructed to fit concentrically one within the other, said sleeves being provided at one end with a plurality of locking-faces, an odd number on one and an even number on the other, and a key for forming a locking connection between a pair of said faces.

2. The combination of a brake-beam and a brake-head each embodying a sleeve constructed to fit concentrically one within the other, said sleeves being provided at their outer end with a plurality of locking-faces, an odd number on one and an even number on the other, and a key for forming a locking connection between a pair of said faces.

3. The combination of a brake-beam and a brake-head each embodying a sleeve constructed to fit concentrically one within the other, peripheral flanges on said sleeves, one of said flanges having an odd number and the other an even number of openings, and a key to fit in a pair of said openings to lock the sleeves together.

4. The combination of a brake-beam and a brake-head each embodying a sleeve constructed to fit concentrically one within the other, peripheral flanges on said sleeves at one end thereof, one of said flanges having an odd number and the other an even number of openings, and a key to fit in a pair of said openings to lock the sleeves together.

5. The combination of a brake-beam and a brake-head each embodying a sleeve constructed to fit concentrically one within the other, peripheral flanges on said sleeves at the outer end thereof and lying adjacent to each other, one of said flanges having an odd number and the other an even number of transverse openings, and a key to fit in a pair of said openings to lock the sleeves together.

GEORGE ALVERADO WOODMAN.

Witnesses:
WM. O. BELT,
M. A. KIDDIE.